United States Patent [19]

Yomota et al.

[11] 4,248,638

[45] Feb. 3, 1981

[54] METHOD FOR PREPARING A MAGNESIA CARBON BRICK

[76] Inventors: Junji Yomota, 640-8 Orida; Fumiaki Kurashina, 2591-40 Komagoe; Mareyasu Kamiide, 540 Orida, all of Shimizushi, Shizuoka-ken; Ichiro Takita, 1612-4 Oaza Kumade Aza Kurogahata Nishi-ku, Kita Kyushu-shi, Fukuoka-ken, all of Japan

[21] Appl. No.: 46,030

[22] Filed: Jun. 6, 1979

Related U.S. Application Data

[63] Continuation-in-part of Ser. No. 867,937, Jan. 9, 1978, abandoned.

[30] Foreign Application Priority Data

Aug. 12, 1977 [JP] Japan ................................. 52-96124

[51] Int. Cl.³ ........................ C04B 35/04; C04B 35/52
[52] U.S. Cl. ......................................... 106/56; 106/58
[58] Field of Search ....................... 106/56, 58; 260/38

[56] References Cited

U.S. PATENT DOCUMENTS

| | | | |
|---|---|---|---|
| 1,674,961 | 6/1928 | Diamond | 106/56 |
| 3,442,669 | 5/1969 | Osterholtz | 106/56 |
| 3,717,602 | 2/1973 | Koch et al. | 260/38 |

*Primary Examiner*—James Poer
*Attorney, Agent, or Firm*—Pearne, Gordon, Sessions, McCoy & Granger

[57] ABSTRACT

A magnesia carbon brick comprising a mixture of magnesia clinker and carbon, novolak phenol resin and a hardening agent. A method for preparing the magnesia carbon brick comprising the steps of mixing magnesia clinker and carbon together, adding novolak phenol resin and a hardening agent to said mixture of magnesia clinker and carbon and mixing, molding and drying the resultant mixture.

13 Claims, No Drawings

METHOD FOR PREPARING A MAGNESIA CARBON BRICK

CROSS REFERENCE TO RELATED APPLICATION

This is a continuation-in-part of application Ser. No. 867,937, filed Jan. 9, 1978, now abandoned.

BACKGROUND OF THE INVENTION

This invention relates to magnesia carbon bricks and more particularly, to magnesia carbon bricks for use as the linings of various furnaces and their associated hot metal handling devices and a method for preparing such bricks.

Magnesia carbon bricks have been in the lime-light as the materials for the linings of various furnaces and their associated hot metal handling devices in recent years because such bricks have excellent corrosion and spalling resistance properties and the application range of such bricks is increasing. However, the above-mentioned excellent properties of such bricks have not been fully utilized because such bricks encounter difficulties in the preparation thereof.

Among the difficulties, one most important difficulty is that since a substantial difference in specific gravity is present between magnesia and graphite which are principal components of magnesia carbon brick and graphite generally has poor wettability, these components cannot be easily admixed and molded and accordingly, a magnesia carbon brick cannot be obtained with a sufficient density. In order to compensate for the poor wettability of graphite, a binder such as pitch, tar or the like is generally employed in the mixture of magnesia clinker and carbon. However, such binder emits an offensive smell to give discomfort to the operator and/or chap the operator's skin and as a result, the admixing operation cannot be performed in an effective manner.

In order to overcome the difficulties encountered in the preparation of prior art magnesia carbon bricks by the conventional methods, in place of the conventional pitch or tar, the use of phenol resins as the binder has been proposed.

SUMMARY OF THE INVENTION

We have found that when novolak type phenol resin in a liquid form is added to the mixture of magnesia clinker and carbon as the binder together with a suitable hardening agent, a magnesia carbon brick which exhibits excellent properties such as corrosion and spalling resistance can be obtained.

Phenol resins are generally classified into novolak type and resol type based on the preparation procedure. The resin to be employed as the binder in the present invention is novolak type phenol resin. Resol type phenol resin is produced by causing phenol to react with formaldehyde in an excess amount under the presence of an alkaline catalyst. The resol type phenol resin is usually dissolved in a solvent such as water or alcohol and exhibits excellent effects as the binder for the principal components of magnesia carbon brick. However, when formaldehyde is employed as the binder, the remaining unreacted formaldehyde emits a unique irritating smell in the preparation of a refractory product such as magnesia carbon brick to give discomfort to the operator to thereby make it substantially impossible to prepare such refractory product. Therefore, according to the present invention, as the binder for the above purpose, novolak phenol resin is employed in place of resol type phenol resin. The novolak phenol resin binder is prepared by causing phenol in an excess amount to react with formaldehyde under the presence of an acid catalyst.

Novolak type phenol resin is usually in the state of mass or fine particle and accordingly, when the phenol resin is to be suitably employed in the preparation of a refractory product as the binder for the principal components of the refractory product, the phenol resin is usually added thereto a suitable kneading acceleration agent to thereby render the refractory mixture moldable. Such kneading acceleration agent is usually selected from alcohols which are capable of dissolving the phenol resin therein. However, when this type of phenol resin is mixed with the principal components of a refractory product to be obtained and the resin and principal components are kneaded together in a conventional manner with the addition of the above-mentioned kneading acceleration agent thereto, the added phenol resin usually does not melt perfectly within the time of kneading step, but a substantial amount of the added phenol resin remains in the state of fine particle and/or mass. This type of phenol resin has a bulk density substantially lower than that of the refractory principal components such as carbon and magnesia clinker and as a result, even when the resin is employed in a smaller weight ratio to that of the refractory mixture, it will be easily understood that the phenol resin will come to have a substantially greater volume ratio to that of the clinker and carbon. Thus, when the thus obtained refractory product is actually employed as the lining of a furnace, the portion of the phenol resin which remained unmelted in the state of fine particle and/or mass in the composition of the refractory product is carbonized through the cycle of softening-hardening-vaporization-decomposition as the temperature of the refractory lining increases and about 40–50 percent of the total amount of phenol resin employed is lost during the carbonization. As a result, a void or voids are formed in the refractory brick corresponding to the lost volume of the phenol resin and thus, in the operation of a practical furnace lined with such refractory product, the refractory lining will come to have a substantially high porosity. Since the presence of such unmelted phenol resin portion in the refractory composition causes an uneven bond between the components of the refractory composition, in order to provide a desired or required strength to the refractory product, a substantial amount of the binder or phenol resin is required to be employed to the degree that the preparation of a refractory product is disadvantageous from the viewpoint of economy.

PREFERRED EMBODIMENT OF THE INVENTION

In order to eliminate the above-mentioned disadvantages, improve the packing density in the refractory composition and maintain the porosity of the refractory product to a low value as much as possible during the operation of the furnace lined with such refractory product, according to the present invention, prior to the addition to the principal components of magnesia carbon brick, the novolak phenol resin is dissolved in a solvent which may comprise at least one member selected from glycols such as ethylene glycol, propylene glycol, diethylene glycol, polyethylene glycol or a mixture thereof or glycerines and the phenol resin in its solution state is added to the principal compoments of a magnesia carbon brick.

As the solvents employed for dissolving the novolak phenol resin, monohydric alcohols such as methyl alcohol and ethyl alcohol, polyhydric alcohols referred to hereinabove, ketones such as dimethyl ketone and methyl ketone and esters such as ethyl Cellosolve acetate and butyl Cellosolve acetate have been known. However, the solvents other than dihydric alcohols and trihydric alcohols which are advantageously employed in the present invention have inherent offensive smells and/or low flashing points which present problems relating to operation efficiency, environment conditions and handling and accordingly, the other solvents cannot be practically employed in the present invention.

Novolak phenol resins which constitute the novolak phenol solutions employed in the present invention may have any average molecular weight, but preferably have average molecular weights within the range of 300–600. As the average molecular weight of novolak type phenol resin increases, the viscosity of the solution formed from the phenol resin increases accordingly and the wettability of the solution with respect to carbon decreases resulting in unsatisfactory mixing result of the components of the magnesia carbon brick to be obtained, entrapping of a substantial amount of air in the brick composition and low bulk specific gravity and insufficient density in the brick composition in the molding step thereof. On the other hand, as the average molecular weight of novolak phenol resin decreases, the amount of unreacted phenol in the brick composition tends to increase accordingly and the offensive small emitted from such unreacted phenol gives discomfort to the operator.

The concentration of resin in the phenol resin solution employed in the present invention is preferably within the range of 40–80 percent. When the resin concentration is below 40 percent, a desired strength cannot be obtained for the obtained magnesia carbon brick. On the other hand, when the resin concentration exceeds 80 percent, if any one or more of the above-mentioned polyhydric alcohol systems are employed, the viscosity of the phenol resin will exceed 400 poise/25° C. and makes it impossible to knead the magnesia carbon brick components and phenol resin together at room temperature.

According to the present invention, in addition to the above-mentioned novolak phenol resin solution, a hardening agent which is capable of maintaining the phenol resin undissolved and unmelted under heating conditions is required. The hardening agents useful in the present invention include paraformaldehyde, dioxane, trioxane and hexamethylenetetraamine, but hexamethylenetetraamine is preferable because this material does not present serious problems relating to operation environment and handling.

The principal components employed in the present invention include sea water magnesia clinker, fused magnesia clinker and other magnesia clinkers as the magnesia clinker component, but magnesia clinkers containing over 90 percent by weight of MgO based on the weight of the clinker are preferable. When the amount of MgO is less than 90 percent, the obtained magnesia carbon brick will generally have insufficient values with respect to properties such as corrosion resistance, compressive strength and bending strength. And as the carbon component which is the other of the principal components in the magnesia carbon brick, scaling graphite, amorphous graphite or other carbonaceous materials can be employed. The blending ratio of magnesial clinker to carbon is preferably within 70–95:5–30. When the blending ratio in which magnesia clinker is below 70 and graphite is over 30 is employed, the above-mentioned general properties of magnesia carbon brick cannot be obtained and oxidation of graphite is undesirably accelerated.

The amount of the novolak phenol resin employed as the binder in the present invention is within 2–6 percent by weight based on the combined weight of the principal components such as clinker and carbon. When the novolak phenol resin is employed in an amount less than 2 percent by weight based on the combined weight of clinker and carbon, the wettability of the carbon is reduced to thereby make it difficult to obtain a desired magnesia carbon brick. On the other hand, when the amount of the phenol resin solution exceeds 6 percent, the so-called lamination phenomenon occurs to thereby make it also difficult to obtain a desired magnesia carbon brick. Hexamethylenetetraamine to be added as the hardening agent is preferably employed in an amount within the range of 5–20 percent by weight based on the weight of the novolak phenol resin. When the hardening agent is employed in an amount below 5 percent by weight based on the phenol resin, the polymerization degree of the components of a desired magnesia carbon brick after the hardening thereof is insufficient and the obtained brick will have insufficient strength. On the other hand, when the amount of the hardening agent exceeds 20 percent by weight based on the weight of the novolak phenol resin, the porosity of the obtained refractory product or magnesia carbon brick increases undesirably.

In the preparation of the magnesia carbon brick referred to hereinabove, when at least one of metal silicon, silicon carbide and silicon nitride is added as the antioxidant or antioxidants to the composition of the brick, the obtained brick exhibits antioxidation effects. And when the brick composition is added thereto at least one of sodium pyrophosphate, sodium hexametaphosphate and magnesium phosphate, the antioxidation effects of the obtained brick will be further enhanced. In the addition of the above-mentioned antioxidants to be added to the refractory composition, if the antioxidant or antioxidants are previously added to the novolak phenol resin, the antioxidant or antioxidants are uniformly distributed within the resultant refractory product. In order to assist the antioxidation effects provided by the antioxidant or antioxidants, it is preferable that the magnesia carbon brick is covered by a metal cover and other inorganic and organic materials which can withstand heats up to 500°–900° C.

Antioxidants useful in the present invention include (1) an antioxidant comprising 10–30 percent by weight of graphite particles smaller than 2 mm, 3–8 percent by weight of clay smaller than 1 mm, 3–8 percent by weight of sodium silicate (*) particle, 5–15 percent by weight of liquid sodium silicate and the rest of magnesia clinker and (2) an antioxidant comprising 100 weight parts of the composition comprising 10–30 percent by weight of graphite particle, 3–8 percent by weight of clay, 8–15 percent by weight of sodium silicate and the rest of magnesia clinker and 3–5 weight parts of water.

*The term "sodium silicate", as used herein, refers to materials commonly identified as having the formula $Na_2O \cdot NSiO_2$, where N is from 2 to 4.

Specific examples of the present invention and controls will be given hereinbelow for comparison purposes. The effects of various novolak phenol resin solutions employed as the binders were considered. In any of the examples, hexamethylenetetraamine was added in the amount of 10 percent by weight based on the weight of the novolak phenol resin employed.

ties exhibited by Control I (refractory product) after heat treatment. Such properties of Examples E–H of the invention impart carbon with excellent resistance against oxidation which is one of the most important disadvantages inherent in carbon bond refractory products and show satisfactory results when employed in actual furnaces as the linings thereof.

| | Controls | | | | Examples | | | | Control |
|---|---|---|---|---|---|---|---|---|---|
| | A | B | C | D | E | F | G | H | I |
| Sintered magnesia clinker | 80 | 80 | 80 | 80 | 80 | 80 | 80 | 80 | 80 |
| Graphite | 20 | 20 | 20 | 20 | 20 | 20 | 20 | 20 | 20 |
| Phenol resin solution | +3.5 | +3.5 | +3.5 | +4 | +3.5 | +3.5 | +3.5 | +4 | Fine phenol resin particle +4 |
| Solvent | Ethylalcohol | Furfuryl alcohol | Ethylene glycol | Ethylene glycol | Ethylene glycol | Diethylene glycol | Glycerine | Ethylene glycol & polyethylene glycol | Diethylene glycol +2 |
| Resin concentration (wt %) | 60 | 70 | 30 | 85 | 50 | 50 | 50 | — | |
| Viscosity (poise/25° C.) | 35 | 100 | 15 | 600 | 80 | 85 | 110 | — | |
| Offensive smell at mixing & molding (*1) | Strong | Strong | Weak | Weak | Weak | Weak | Weak | Weak | |
| Property after drying | | | | | | | | | |
| Apparent specific gravity | 2.93 | 2.91 | 2.91 | | 2.88 | 2.87 | 2.86 | 2.75 | |
| Bulk specific gravity | 2.72 | 2.71 | 2.71 | Mixing is impossible | 2.73 | 2.71 | 2.71 | 2.70 | 2.64 |
| Apparent porosity (%) | 7.2 | 6.8 | 7.0 | | 6.0 | 5.8 | 5.7 | 5.5 | 4.0 |
| Compressive strength (kg/cm$^2$) | 326 | 368 | 213 | | 335 | 318 | 321 | 325 | 334 |
| Bending strength at cold temp. (kg/cm$^2$) | 152 | 172 | 68 | | 166 | 149 | 150 | 150 | 148 |
| 1400° C. (kg/cm$^2$) (2*) | 35 | 38 | 13 | | 34 | 33 | 34 | 28 | |
| Property after heat treatment | | | | | | | | | |
| Apparent specific gravity | 3.13 | 3.12 | 3.15 | | 3.13 | 3.13 | 3.14 | 3.14 | 3.10 |
| Bulk specific gravity | 2.73 | 2.72 | 2.73 | | 2.74 | 2.73 | 2.74 | 2.74 | 2.56 |
| Apparent porosity (%) | 12.8 | 12.7 | 13.3 | | 12.6 | 12.7 | 12.7 | 12.8 | 17.5 |
| Compressive strength (kg/cm$^2$) | 155 | 163 | 87 | | 157 | 149 | 149 | 151 | 116 |
| Bending strength (kg/cm$^2$) | 34 | 40 | 15 | | 36 | 35 | 36 | 34 | 23 |

(*1)Treatment at 180° C. for 20 hours
(*2)Treatment at 1500° C. for 10 hours

Controls A and B emit strong offensive smell at kneading and molding and are unsuitable from the viewpoint of environmental conditions. Control C having the low resin concentration provides insufficient strength to the obtained magnesia carbon brick or refractory product.

Examples E through H of the present invention show substantially lower apparent porosities and excellent strengths as compared with the corresponding properties exhibited by Control I (refractory product) after

EXPERIMENTS

Experiments were conducted to determine the effects acting on properties of refractory products by the employment of the novolak phenol resin solutions in different amounts and the hardening agent in different amounts and the results of the experiments will be given hereinbelow.

| | J | K | L | M | N | O | P | Q |
|---|---|---|---|---|---|---|---|---|
| Sintered magnesia clinker | 80 | 80 | 80 | 80 | 80 | 80 | 80 | 80 |
| Graphite | 20 | 20 | 20 | 20 | 20 | 20 | 20 | 20 |
| Novolak phenol resin solution (Z) | +1 | +2 | +5 | +7 | +4 | +4 | +4 | +4 |
| Hexamethylenetetramine | | +0.1 | +0.2 | +0.5 | +0.7 | +0.1 | +0.2 | +0.4 | +1.2 |
| Property after drying | | | | Lamination | | | | |

-continued

|  | J | K | L | M | N | O | P | Q |
|---|---|---|---|---|---|---|---|---|
| Apparent specific gravity | 2.95 | 2.92 | 2.90 | occurs at molding | 2.90 | 2.90 | 2.89 | 2.91 |
| Apparent porosity (Z) | 12.6 | 7.4 | 6.1 |  | 6.9 | 6.0 | 5.9 | 8.6 |
| Compressive strength (kg/cm$^2$) | 98 | 286 | 352 |  | 176 | 332 | 351 | 302 |
| Bending strength (kg/cm$^2$) | 31 | 125 | 171 |  | 72 | 158 | 164 | 118 |

The refractory product (J) having phenol resin added thereto in an amount less than the lower limit of the specified resin addition range of the invention shows insufficient strength and the refractory product (M) having phenol resin added thereto in an amount over the upper limit of the specified resin addition range of the invention shows the lamination phenomenon leading to cracks and is unsuitable for its intended purpose. It is clear that the suitable amount of the hardening agent to be employed is within the range of 5–20 percent weight based on the weight of the phenol resin.

The refractory products of the present invention find their applications as the linings of the hearths, bottoms and cone parts of converters, of the roofs, walls, bottoms and tapping spouts of electric arc furnaces, ladles, of hot metal mixing furnaces and of torpedos.

While several embodiments of the invention have been described in detail, it will be understood that the same are for illustration purpose only and not to be taken as a definition of the invention, reference being had for this purpose to the appended claims.

What we claim is:

1. A method for preparing a magnesia carbon brick comprising the steps of molding into a brick a mixture of magnesia clinker containing at least 90 percent by weight of MgO based on the weight of said magnesia clinker, carbon, a phenolic novolak resin having an average molecular weight of 300 to 600 dissolved in at least one solvent and an amount of a curing agent therefor sufficient to convert the novolak to a thermoset condition, wherein the magnesia clinker and carbon are present in a weight ratio within the range of 70 to 95 parts and 5 to 30 parts, respectively, the phenolic novolak resin solution is at a concentration within the range of 40 to 80 percent by weight, and the amount of the phenolic novolak resin ranges from 2 to 6 percent based on the weight of the mixture of magnesia clinker and carbon, and drying the brick.

2. The method as set forth in claim 1, in which the mixture of magnesia clinker, carbon, novolak resin dissolved in a solvent and curing agent for the novolak resin is produced by dissolving the novolak resin in the solvent and mixing the resulting solution with the other ingredients of the mixture.

3. The method as set forth in claim 2 in which said solvent is selected from the group consisting of ethylene glycol, propylene glycol, diethylene glycol, polyethylene glycol, mixtures of the foregoing glycols and glycerin.

4. The method as set forth in claim 3, in which said magnesia clinker is one selected from the group consisting of sea water magnesia clinker and fused magnesia clinker.

5. The method as set forth in claim 3, in which said carbon is one selected from the group consisting of scaling graphite and amorphous graphite.

6. The method as set forth in claim 2, in which said novolak phenol resin is dissolved in a solvent including at least one dihydric or trihydric alcohol.

7. The method as set forth in claim 1, in which said curing agent is a member selected from the group consisting of paraformaldehyde, dioxane, trioxane and hexamethylenetetraamine.

8. A magnesia carbon brick produced by the method claimed in claim 1.

9. The method as set forth in claim 1, including the further step of adding an anti-oxidant comprising at least one member selected from the group consisting of metal silicon, silicon carbide and silicon nitride to said mixture.

10. The method as set forth in claim 2, including the further step of adding a first antioxidant comprising at least one member selected from the group consisting of metal silicon, silicon carbide and silicon nitride and a second antioxidant comprising at least one member selected from the group consisting of sodium pyrophosphate, sodium hexametaphosphate and magnesium phosphate to said mixture.

11. The method as set forth in claim 10, in which at least one of said metal silicon, silicon carbide and silicon nitride powder has been previously dispersed in said novolak phenol resin solution.

12. The method as set forth in claim 11, in which said first and second antioxidants have been previously dispersed in said novolak phenol resin solution.

13. The method as set forth in claim 1, including the further step of covering said brick with a metal cover.

* * * * *

UNITED STATES PATENT AND TRADEMARK OFFICE
CERTIFICATE OF CORRECTION

PATENT NO. : 4,248,638

DATED : February 3, 1981

INVENTOR(S) : Junji Yomoto et al.

It is certified that error appears in the above—identified patent and that said Letters Patent is hereby corrected as shown below:

First chart on page of columns 5 and 6, under Column D in middle of page delete "Mixing is impos-" and insert --Mixing is impossible--.

Signed and Sealed this

Fifth Day of May 1981

[SEAL]

Attest:

RENE D. TEGTMEYER

*Attesting Officer*　　*Acting Commissioner of Patents and Trademarks*